No. 679,887. Patented Aug. 6, 1901.
E. L. CLARK.
LADDER HOOK.
(Application filed Mar. 28, 1901.)

(No Model.)

Inventor
Elwood L. Clark.

Witnesses

By

Attorneys

UNITED STATES PATENT OFFICE.

ELWOOD L. CLARK, OF BUCKEYE, MICHIGAN.

LADDER-HOOK.

SPECIFICATION forming part of Letters Patent No. 679,887, dated August 6, 1901.

Application filed March 28, 1901. Serial No. 53,304. (No model.)

*To all whom it may concern:*

Be it known that I, ELWOOD L. CLARK, a citizen of the United States, residing at Buckeye, in the county of Hillsdale and State of Michigan, have invented certain new and useful Improvements in Ladder-Hooks; and I do hereby declare the following to be a full, clear, and exact description of the invention, such as will enable others skilled in the art to which it appertains to make and use the same.

This invention has relation to hooks for holding pails, buckets, and receptacles in suspension from the rung of a ladder, the purpose being the provision of a hook which will enable the pail or bucket to be attached to or removed from the rung without necessitating the detachment of the hook from the pail or endangering the dropping of the latter during the coupling and the uncoupling operation and which will obviate the straining of the hook incident to the turning and twisting of the pail or bucket.

For a full description of the invention and the merits thereof and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1:
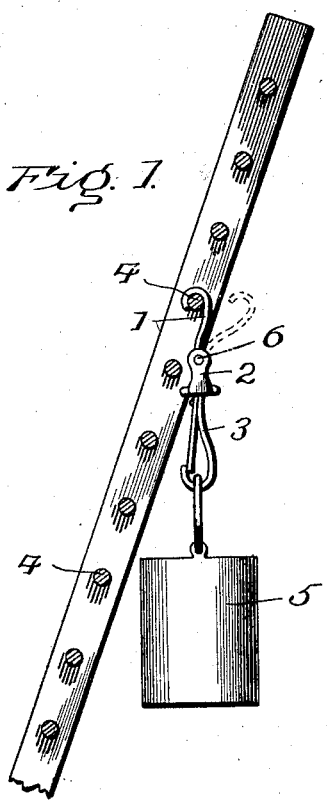
Figure 2:
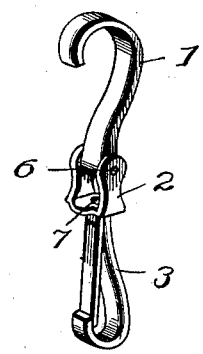
Figure 3:
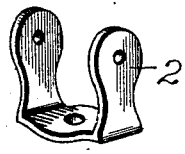
Figure 4:
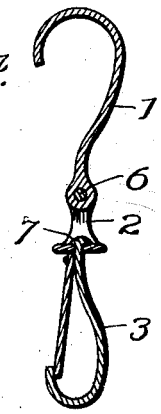

Figure 1 is a view in elevation of the hook, showing a pail or bucket suspended thereby from the rung of a ladder, the dotted lines indicating the attaching-hook turned to be fitted to or removed from the said rung, as desired. Fig. 2 is a perspective view of the hook. Fig. 3 is a detail view of the yoke employed for connecting the attaching and supporting hooks. Fig. 4 is a detail section.

Corresponding and like parts are referred to in the following description and indicated in all the views of the drawings by the same reference characters.

The hook comprises three elements or parts 1, 2, and 3, coupled in such a manner as to admit of the part 3 turning to any angular position and the part 1 to be turned so as to be fitted to the rung 4 of a ladder or analogous support or removed therefrom, as indicated by the dotted lines in Fig. 1, without necessitating the detachment of the part 3 from the bail of the bucket, pail, or analogous receptacle 5. The part 1 is a hook and its purpose is to attach the device and the part supported thereby to the rung 4 or like part. One member (the shank) of the attaching-hook 1 has its lower end formed into an eye to receive a pin 6, upon which it is pivotally or hingedly mounted and which connects the hook 1 with the part or yoke 2. The part 3 is also of hook form and is provided with a spring mousing or tongue to prevent displacement of the article fitted to and suspended directly from the hook 3. In general character the part 3 is a snap-hook and its shank is provided with a headed terminal 7 to make a swivel connection with the yoke 2, the latter being centrally apertured to receive the part 7. The yoke 2 couples the supporting-hook 3 and the attaching-hook 1 and admits of the supporting-hook 3 turning freely about a vertical axis when the hook is in position, thereby preventing torsional strain thereon incident to the turning and twisting of the pail or receptacle 5. The attaching-hook 1 can be turned so as to engage over the rung 4, as indicated by the full lines in Fig. 1, or to clear the said rung, as indicated by the dotted lines in said figure, and in both positions of the attaching-hook the supporting-hook will occupy a vertical position with the pail or receptacle 5 suspended therefrom.

Ladder-hooks designed for painters and workmen operating from a ladder, scaffold, or other elevated point are subjected to torsional strain by the twisting and lateral movements of the bucket or receptacle suspended thereby. A hook constructed in accordance with this invention prevents this torsional strain, since the lower member or supporting-hook 3 will turn with the part attached thereto, thereby preventing the usual twisting and torsional strain. Another advantage resulting from having the attaching-hook connected by a pivotal or hinged joint is that the hook may be applied to or disengaged from the rung of a ladder or like support without requiring the removal of the bucket or receptacle from the hook or without endangering the slipping or disengagement of the said bucket from the hook. This operation generally requires the use of two hands when manipulating ladder-hooks of ordinary construction; but with a hook constructed in accordance with this invention the operation can be performed with one hand, thereby leaving the other hand free for any desired purpose, which is of material advantage, as will be readily appreciated.

The yoke, as shown, is of approximately U shape and its side members are transversely pierced to receive the pivot-pin 6, upon which the attaching-hook 1 turns, and the closed end is pierced to receive the attaching end 7 of the supporting-hook 3.

Having thus described the invention, what is claimed as new is—

Means for suspending a bucket or like receptacle from the rung of a ladder, the same comprising an attaching-hook free to move forward or backward from a straight line passing through the pivot of the hook and lengthwise of the latter, a U-shaped yoke, a pin connecting the side members of the yoke and forming the axis for the said hook to turn upon, and a supporting-hook connected to the closed end of the yoke by a swivel-joint, substantially as set forth.

In testimony whereof I affix my signature in presence of two witnesses.

ELWOOD L. CLARK. [L. S.]

Witnesses:
GEORGIA DURBIN,
CHAS. DURBIN.